United States Patent [19]

Lanphier

[11] Patent Number: 5,527,409
[45] Date of Patent: Jun. 18, 1996

[54] METHOD OF MAKING RECYCLED TIRE ROOF SHEETING

[76] Inventor: Robert R. Lanphier, W11148 Hwy. 16 & 60, Columbus, Wis. 53925

[21] Appl. No.: 397,959

[22] Filed: Mar. 3, 1995

[51] Int. Cl.⁶ .................................................. B32B 5/16
[52] U.S. Cl. .................. 156/71; 156/255; 428/903.3; 82/47; 82/101; 264/158; 52/DIG. 9; 241/3; 241/DIG. 31
[58] Field of Search .................................. 156/255, 256, 156/259, 21; 264/118, 126, 158, 159; 428/218, 903.3; 82/46, 47, 101; 52/DIG. 9; 241/3, DIG. 31

[56] References Cited

U.S. PATENT DOCUMENTS

| | | |
|---|---|---|
| 3,230,803 | 1/1966 | Guilford ................................ 82/101 X |
| 4,810,560 | 3/1989 | Sell . | |
| 5,086,552 | 2/1992 | Moore . | |
| 5,094,905 | 3/1992 | Murray .................................... 428/218 |
| 5,258,222 | 11/1993 | Crivelli .................................. 428/323 |
| 5,316,708 | 5/1994 | Drews . | |
| 5,319,834 | 6/1994 | Voigts ........................ 241/DIG. 31 X |

Primary Examiner—Michael W. Ball
Assistant Examiner—Sam Chuan Yao
Attorney, Agent, or Firm—Low and Low

[57] ABSTRACT

An inexpensive, durable, and easily applied roofing material for commercial establishments prepared from waste and used tires, wherein the tires are shredded into small particle size, and thence uniquely compacted into large log-like article of substantial size and weight, as on the order of 2,000 pound and four feet in length. The logs are cut in a peeling manner to form wound up rolls of thin rubber tire sheeting, which are then cut and laid as roofing. Sealant applied over the roofing ensures waterproofing, enhances ultraviolet ray protection, adds to overall fire resistance, and helps to prevent leakage at the sheeting joints.

11 Claims, 2 Drawing Sheets

METHOD OF MAKING RECYCLED TIRE ROOF SHEETING

BACKGROUND OF THE INVENTION

The waste problem of worn and used rubber tires and tire carcasses has been and is a significant waste problem by virtue of the sheer quantity and bulk thereof, and unsuitability for quick and easy destruction. Accordingly, there have been over the years numerous efforts throughout the United States to devise economically effective and practical ways and means of recycling used tires to both reduce the sheer burden thereof as well as to produce useful products.

Some of these efforts are reflected in United States patents. Illustratively thereof are the patents to:

Moore U.S. Pat. No. 5,086,552, who slices the whole tire carcass into shingle-like pieces;

Crivelli U.S. Pat. No. 5,258,222, who granulates the tires into "crumbs", mixing the same with liquid binder in a slurry, and casting the slurry into a roof shingle;

Murray U.S. Pat. No. 5,094,904, who shreds discarded tires into fragments, and molded with an adhesive into a rubber beam for various uses;

Sell U.S. Pat. No. 4,810,560, who mixes rubber crumb with a liquid resin binder to form a batting box mat for baseball game use;

Drews U.S. Pat. No. 5,316,708, who mixes latex with shredded tires to form structural building blocks.

There are numerous other examples of efforts to satisfactorily reclaim rubber tires in the patent art as well in literature. While these efforts are commendable, substantial manipulation of the tires and chemical or other liquid materials are required to obtain a serviceable product.

SUMMARY OF THE INVENTION

The object of the present invention is to effect the production of economical, highly serviceable and utilitarian products from used rubber tires in a simpler and more effective manner than heretofore contemplated.

A further object is to provide a roof sheeting product that is easily prepared and handled, and provides an easily applied large sheet roofing material at lower cost, and yet having long service life, and is especially desirable for inexpensive yet durable roofing of commercial and business establishments.

To this end, the tires are shredded in generally known manner to a small particle size, and substantially all steel belting and fragments thereof are removed by conventional separation techniques, as by magnetism or specific gravity, as well as screening, thereby leaving essentially only the rubber compound material of the tire.

The granular rubber material in substantial quantities is then compacted into a large, generally cylindrical, log. Use of a polymeric binder may assist the log formation.

Upon formation of such logs, which are preferably several feet in length, as four to six feet, the same are then sawn as by a conventional band knife as the log is relatively rotated, thereby to effectively peel a continuous length of relatively thin rubber particle sheet from the log. The peeled length may be on the order, for example, of 760', or 3,000–5,000 square feet from a log. Preferably, the peeled sheeting is rolled into a large size roll for transport to a roofing site.

Thereat, the sheeting may then be severed into large, yet feasibly usable, roofing-size pieces, on the order of 4'×8', for example, for commercial roofing or any other size desired for the roofing installation.

Such roofing sheets are readily and rapidly laid on a roof structure and bonded thereto by adhesive, as a contact cement. The joint line between adjacent roofing sheets is sealed by a coating material which is applied preferably over the entire roofing material surface. Such a sealing coating can be any well known substance for seal purposes that will not adversely react with the rubber roofing, and will essentially accommodate any slight thermal expansion or contraction of the rubber roofing sheets, as commercial silicone or acrylic coating materials.

BRIEF DESCRIPTION OF THE DRAWINGS

The invention will be better understood in connection with the accompanying drawings, in which.

DETAILED DESCRIPTION OF THE INVENTION

Figure 1:
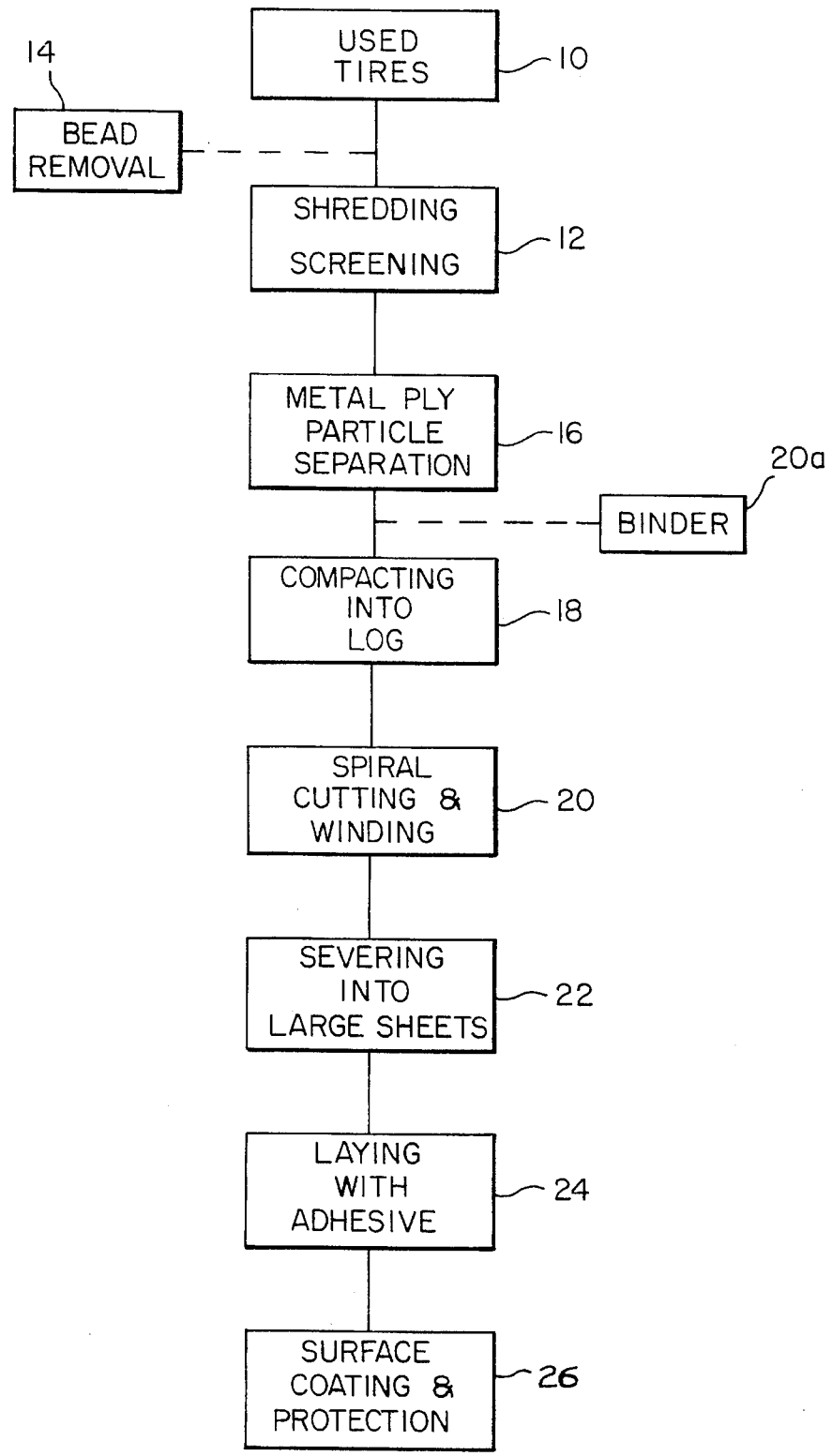
FIG. 1 is a diagrammatic view of the sequence of steps in preparing and utilizing the novel roofing product of the invention.

With reference to FIG. 1, a quantity of used tires at 10, whether blackwall or whitewall, is fed to shredding or granulating equipment at 12 as is well known in the art to reduce and separate the tire material to on the order of about no more than one-quarter inch (¼") particle size. The comminuted tire material will at that point include comminuted metal ply material of the tire, which is conventionally reduced by the shredding equipment.

Where the tires are usual passenger car tires, it is often unnecessary to remove the circular metal beads prior to shredding, as the shredding equipment can also comminute the same. In the event the tire supply includes larger tires of the type employed with heavy duty commercial or industrial tires, it is preferable to first remove the rather heavy and large metal beads therefrom at 14 prior to shredding the remainder of the tire, thereby to facilitate the shredding operation and avoid damage to the equipment from the larger beads. Such bead removal equipment for heavy duty tires is well known, and is exemplified by U.S. Pat. No. 5,319,834 issued Jun. 14, 1994 to Ralph Voigts.

Following the shredding operation, the tire material particulate matter is preferably relatively finely screened or sieved at 8–18 mesh to produce a supply of tire particles of small size, quite generally not in excess of ¼". Either before the screening or afterwards, depending upon the processing equipment available, the particle sized metal ply material is removed from the tire rubber scrap at 16 by known separation techniques. The same may employ magnetic separation of the metal ply material, water washes to separate the relatively dense metal material from the lighter rubber particles, other known means.

A substantial quantity of the relatively fine rubber particles obtained at 16 is then compacted at 18 under sufficient pressure to form a large block or log. Under the invention, the log is preferably of substantial size. Illustratively, one log formed during development of the invention was on the order of 48" in length and 42" in diameter, formed from about 2,000 pounds of tire particles.

Compaction pressure and without additional heat, along with a quantity of suitable binder material compatible with the tire rubber added at 20 before log formation, is sufficient to soften and bond the rubber particles into a substantially homogeneous mass as a large cylindrical log. The binder may be conventional urethane polmers available on the market. If desired, hot compaction with a vulcanizing agent may be effected in lieu of the cold method to obtain the log.

Figure 2:
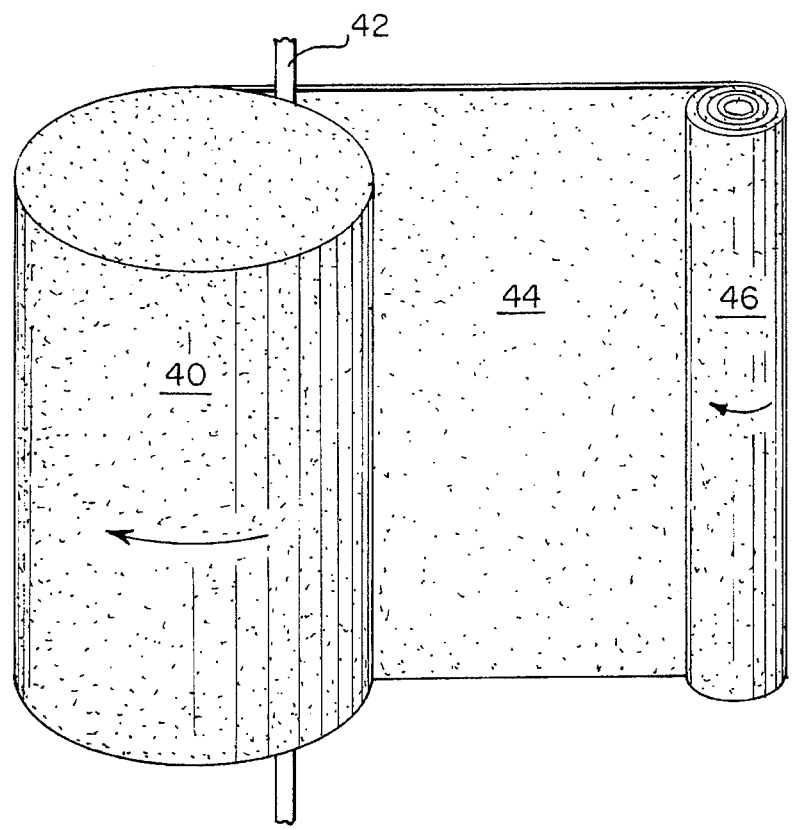
FIG. 2 is an illustration of the steps of sawing the compacted rubber log into an indefinite length and rewinding the thin sheeting into a roll for use; and, FIG. 3 is a fragmentary illustration of portions of adjacent roofing sheets laid on a roof, further illustrating the overlying sealing coating.

Following formation of the massive log, as seen at 40 in FIG. 2, the same is cut or sawn in a spiral manner at 20 by relative rotation between the log 40 and a cutting means, as a band knife 42, FIG. 2. Such cutting means are well known in the art. As the log relatively revolves about its longitudinal axis, the knife 42 is positioned to sever or cut the log into a web 44 of indefinite length, as the saw and the log axis relatively approach each other as the log diminishes in diameter during the spiral cut.

Preferably, in accordance with the invention, the peeled web 44 is on the order of one-eighth inch (⅛") in thickness, thereby to provide a maximum amount of roof sheeting from the log and which may be easily handled in use and installation. Preferably, the cut thickness is on the order of 3/32" to ¾", depending upon roofing requirements and the quality of the tire scrap.

To this end, the web 44 as cut or sawn from the log 40 is preferably wound into an easily manipulated, uncut, roll 46 as seen in FIG. 2. At the end of the severing of the log, or at any desired point therebefore, any remaining uncut log material may be severed from the web, thereby permitting formation of roll 46 to any desired web length dimension, as 760' for example.

Figure 3:
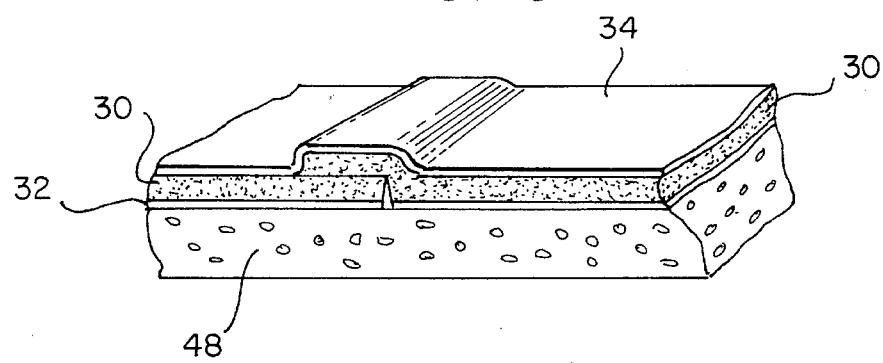

Such a roll 46 of the thin rubber tire roofing material is conveniently transported to a site of roofing installation, as for example, the typical flat roof 48 (FIG. 3) of a commercial or industrial building. At the site, the roll 46 is unwound and the material cut as at step 22 (FIG. 1) into sheets 30 (FIG. 3) of desired size for handling at the roofing project.

Normally, the sheets 30 will be of uniform size for ready handling, as 4'×8' and quick laydown, but may be cut as needed for roof areas requiring special fitting. The sheets are preferably laid in overlapping relation as suggested in FIG. 3. The overlap may be on the order of four inches (4") to ensure an essentially leakproof joint with minimal chance of water or other leakage between sheets. A distinct advantage in the tire material sheets of the present invention, especially as thinly cut at ⅛" or so thickness, is the flexibility thereof in relatively smoothly effecting the overlap, as well as accommodating uneven areas in the roof being sheeted, or to be flexed upwardly or downwardly as necessary or desired to fit roof perimeter or upstanding roof structure zones, somewhat as in the nature of flashing, for example.

The roofing sheets 30 are preferably coated in whole or part with an adhesive 32 on their underside to fixedly bond the roofing sheets to the roof 48 without lateral slippage, as at step 24, FIG. 1.

Finally, at step 26, the rubber roofing sheets 30 are coated over their entire top surface and especially at the lap or butt joints with a sealant 34. The sealant, as a silicone coating or other known polymeric coatings, enhances the waterproof character of the tire sheeting and especially serves to prevent against joint leakage, as aforesaid. Equally importantly, the coating is selected to block or reduce ultraviolet exposure of the rubber material, which degrades the same. Further, the coating aids overall fire resistance. Such coating material, including UV protective coatings, is available from Polydyne Co., for example.

It may be desired that the roofing have an appearance or color other than a gray or black tire color. If so, the sealant coating 34 may have a desired color pigmentation.

As a consequence, a long life and easily applied roofing material is provided in accordance with the invention, which fulfills a ready need in the field especially of inexpensive roofing for business establishments, while contributing to the reduction of tire carcass waste in the United States.

While I have described a preferred and best known mode of my inventive discovery, the same is not limited thereto, but only as defined in the appended claims.

What I claim is:

1. A method for preparing roof sheeting from recycled vehicle tire carcasses comprising the steps of:

comminuting a quantity of used tire carcasses into small particles, compacting the particles into a cylindrical log of relatively substantial dimensions, spirally slicing the log into a continuous thin sheet, and, cutting the sheet into a plurality of roofing sheets.

2. The method of preparing roof sheeting of claim 1 comprising the further step of winding the continuous thin sheet into a roll prior to cutting the same into roofing sheets.

3. The method of preparing roof sheeting of claim 1 comprising the further step of forming a recycled tire particle log on the order of four feet in length and three feet in diameter during said compacting step.

4. The method of preparing roof sheeting of claim 1 comprising the further step of rotating the tire particle log about its longitudinal axis during the slicing step and providing a longitudinally extending knife adjacent the cylindrical periphery of the log during log rotation, and slicing the log in a spiral path, thereby slicing the log into the continuous thin sheet.

5. The method of preparing roof sheeting of claim 1 wherein said slicing step converts said log into a continuous sheet having a thickness on the order of 3/32" to ¾".

6. The method of preparing roof sheeting of claim 1 wherein said cutting step provides roofing sheets on the order of several feet in length and width, thereby to rapidly and efficiently cover a roof structure when emplaced.

7. The method of preparing roof sheeting of claim 1 comprising the further step of removing comminuted metal tire ply particles from the particles prior to forming a log.

8. The method of preparing roof sheeting of claim 7 comprising the further step of removing the tire beads from the tire carcasses prior to the comminuting step.

9. The method of preparing roof sheeting of claim 6 comprising the further steps of:

laying the sheets onto an underlying roof surface in adjacent relation, and, applying sealant at the overlapped sheet margins.

10. The method of preparing roof sheeting of claim 9 comprising the further step of adhesively bonding said sheeting to the roof structure during the laying step.

11. The method of preparing roof sheeting of claim 9 comprising the further step of overlapping the adjacent sheets at their peripheral margins.

\* \* \* \* \*